Figure 17:
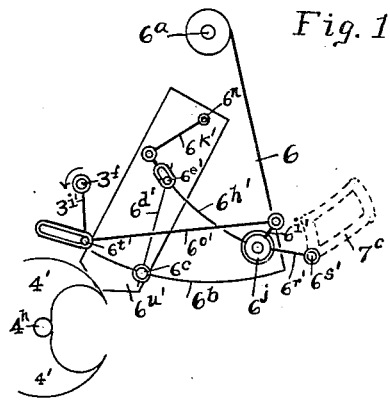

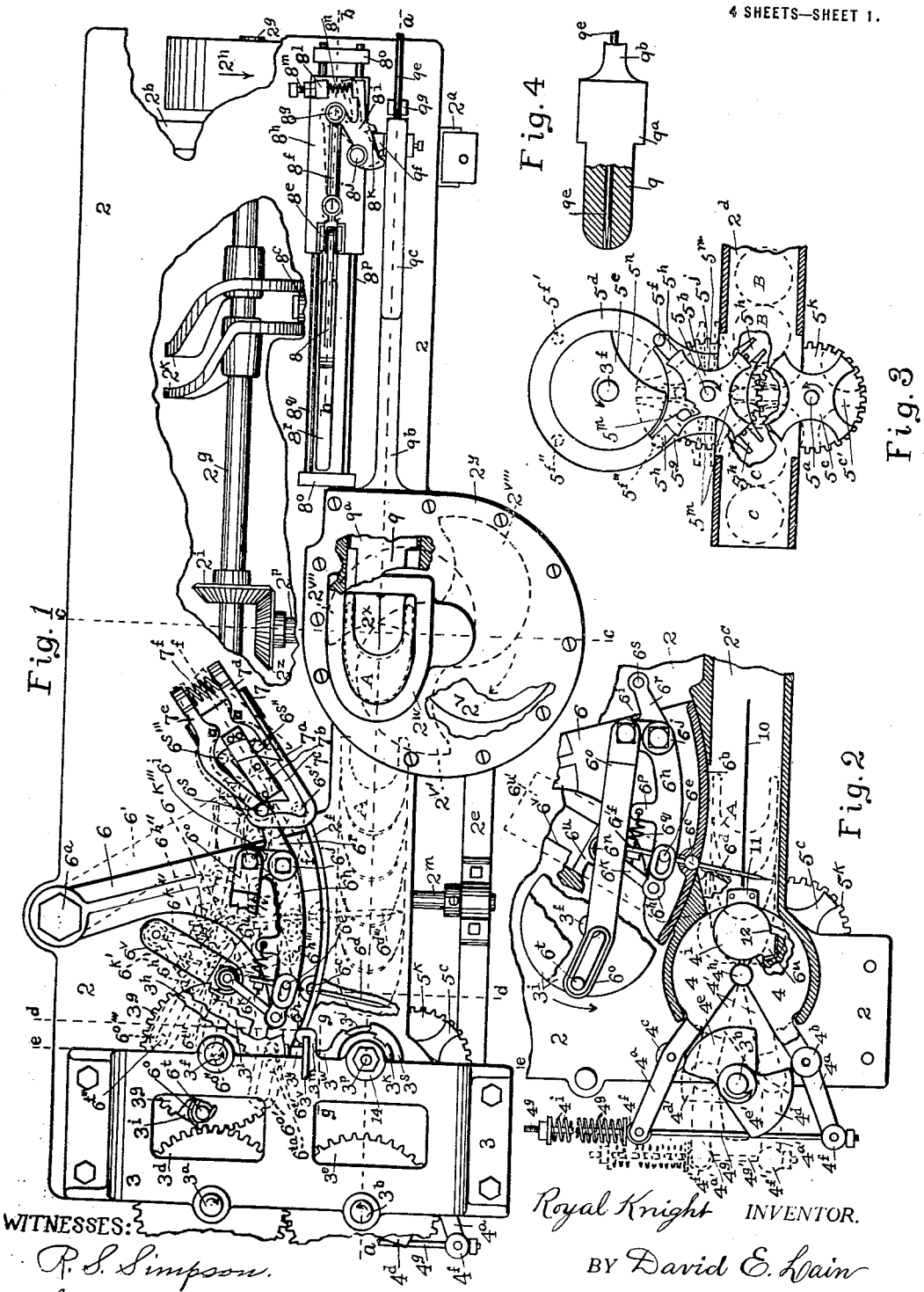

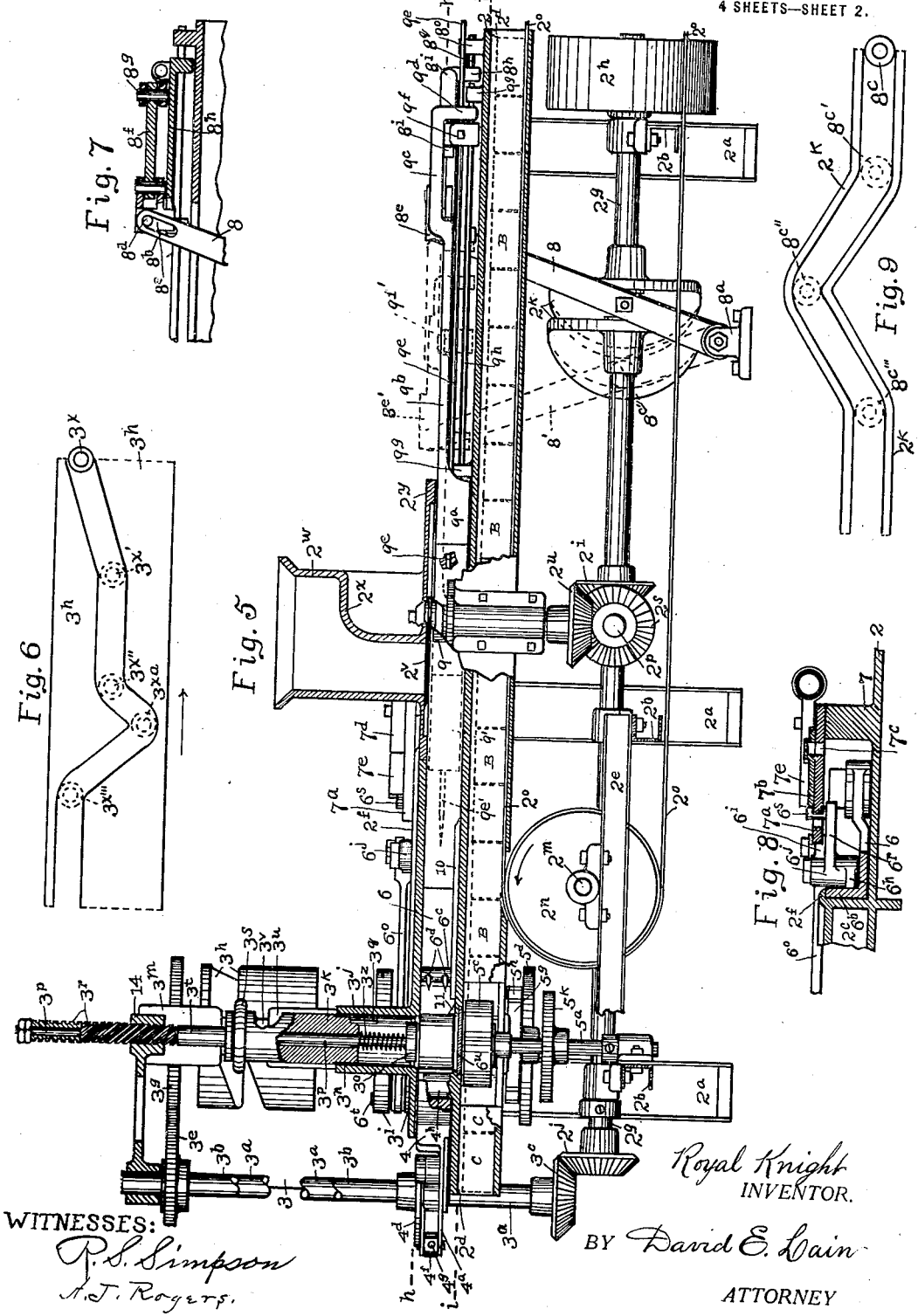

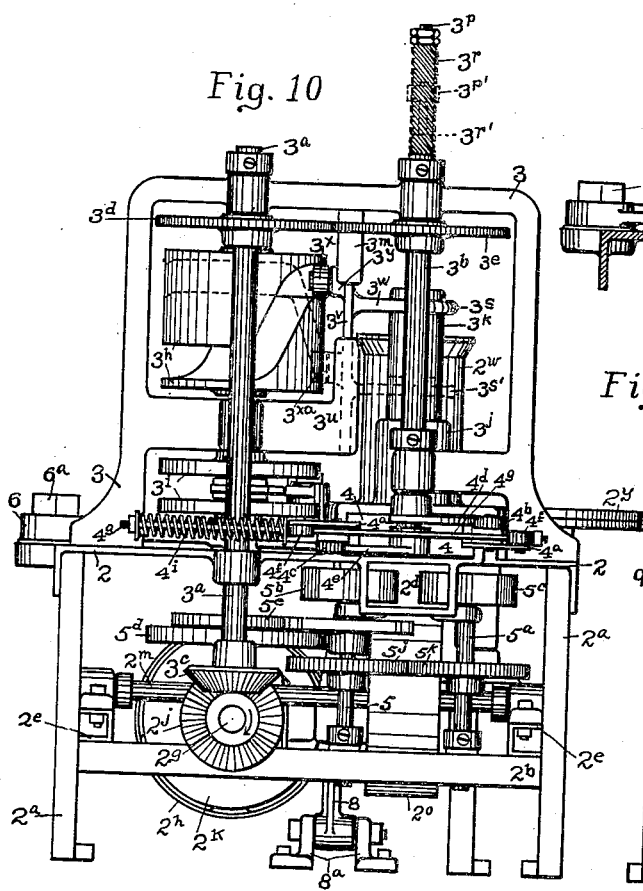

UNITED STATES PATENT OFFICE.

ROYAL KNIGHT, OF BELLINGHAM, WASHINGTON.

CAN-FILLER.

1,250,322.  Specification of Letters Patent.  Patented Dec. 18, 1917.

Application filed July 5, 1916. Serial No. 107,501.

*To all whom it may concern:*

Be it known that I, ROYAL KNIGHT, a citizen of the United States, and a resident of Bellingham, in the county of Whatcom and State of Washington, have invented certain new and useful Improvements in Can-Fillers, of which the following is a specification.

My invention relates to improvements in can fillers used in canning fish and the objects of my invention are to produce a machine which will receive the whole butchered fish, including the shoulder and tail ends, automatically cut the same into can lengths, place and retain the U-form sections cut therefrom nested together and the other sections in regular order, force said sections into a molding device by means which are automatically controlled by the operative capacity of the same, to place the fish in the cans skin outward and with less crushing than usual and to simplify the mechanism used for the purpose. I attain these objects by the mechanism illustrated in the accompanying four sheets of drawings in which Figure 1 is a plan view of my can filler, Fig. 2 is a plan view of a portion of Fig. 1 in section on the line $h$—$h$ of Fig. 5, Fig. 3 is a plan view of another portion of Fig. 1 in section on the line $i$—$i$ of Fig. 5, Fig. 4 is a separated plan view from the bottom of the feed plunger, Fig. 5 is a side elevation the greater part of which is in section on the medial line $a$—$a$ of Fig. 1, Fig. 6 is the development of a cam, Fig. 7 is a side elevation of a portion in section on the line $b$—$b$ of Fig. 1, Fig. 8 is a diagonal elevation of a portion in section on the diagonal line $f$, $f$ of Fig. 1, Fig. 9 is the development of a cam, Fig. 10 is a view in elevation of the delivery or rear end of the machine, Fig. 11 is an end elevation of a portion in section on the bent line $d$—$d$ of Fig. 1, Fig. 12 is an elevation view of the knife plunger, Fig. 13 is an end elevation of a portion in section on the line $e$—$e$ of Fig. 1, Fig. 14 is a limited view in elevation of the receiving or front end of the machine, Fig. 15 is an end elevation in section on the line $c$—$c$ of Fig. 1, Fig. 16 is a separated view of a slide and slideways in side elevation in section on the line $g$—$g$ of Fig. 1 and Figs. 17-20 are diagrammatic plan views illustrating several of the operative positions of the fork feed. Similar characters refer to similar parts in the several views. Certain parts are broken into in order to show other parts hidden thereby.

More particularly: The main frame of my machine consists of the table top 2, legs $2^a$, $2^a$, etc., cross pieces $2^b$, $2^b$, etc., side rails $2^e$, $2^e$, and rear end frame 3. The main driving shaft $2^g$ has the driver pulley $2^h$ and is mounted for revolution in bearings on cross pieces $2^b$, $2^b$, etc. A bevel gear $2^i$ on shaft $2^g$ engages with a bevel gear $2^z$ on a horizontal counter shaft $2^p$. A bevel gear $2^s$ on shaft $2^p$ engages with a bevel gear $2^u$ on vertical, arbor shaft $2^t$. Shaft $2^t$ is mounted for revolution in bearings attached to the table top and mounts the horizontal, spiral-shape knife $2^v$. Said knife is housed in a chamber between the table top and the flange $2^y$. Said flange $2^y$ is the base of fish hopper $2^w$. The lower part of hopper $2^w$ is made U-shape in cross section by the rounded top embossment $2^x$. A horizontal tube $2^c$ of rectangular cross section extends from said hopper to the delivery end of the machine. The feed or fish-slice plunger 9, having handle $9^b$, $9^c$, is mounted for reciprocation in tube $2^c$. Plunger 9 has a longitudinal hole in which is reciprocated a skewer $9^e$. The part $9^c$ of the plunger handle is offset upward, its end $9^d$ is bent at right angles downward and has therein two longitudinal horizontal holes in the upper one of which said skewer is reciprocated. Said part $9^d$ reciprocates on slideway rod $9^h$ which passes through the lower of said holes. Said slideway rod is rigidly mounted in lugs $9^g$, $9^g$ on table top 2 in line with tube $2^c$. Behind slideway rod $9^h$ are two slideway rods $8^p$, $8^q$, parallel therewith and rigidly mounted in lugs $8^o$, $8^o$ on table top 2. Slide $8^h$ having wrist pin $8^d$ is mounted for sliding on rods $8^p$, $8^q$. In the left-hand end of slide $8^h$ are short slideways in which a slide $8^e$ can reciprocate. Lever arm 8 is pivoted in floor brackets $8^a$, $8^a$ and has a slot $8^b$ in its upper end engaged with wrist pin $8^d$. Said arm 8 has near its middle a stud bearing a roller $8^c$. On drive shaft $2^g$ is rigidly mounted cam $2^k$ located to engage roller $8^c$. Said cam is shaped to cause arm 8 to make one complete vibration during one-half of each revolution of shaft $2^g$ and to cause said arm to remain at rest during the other half of said revolution thus causing slide $8^h$ to make one out and return movement on slideways $8^p$ and $8^q$ during one half of each revolution of said shaft. A dog $8^i$ having a notched jaw $8^k$ is pivoted on slide $8^h$ at $8^j$. The rear end of said dog is bifurcated, one leg being connected at $8^g$ to slide $8^h$ by connecting-rod $8^f$, the other leg being provided with a socket in which is seated one end of coil spring $8^n$. The other end of spring $8^n$ abuts in a socket in a lug $8^l$ rigid on slide $8^h$. A screw $8^m$ in said lug bears on spring $8^n$ and is used to adjust the pressure of the same. A block $9^f$ is clamped to skewer $9^e$ under the offset part $9^c$ of feed-plunger handle $9^b$ and is engageable with notch $8^k$ in the jaw of dog $8^i$. The described construction causes skewer $9^e$ to move back and forth with slide $8^h$. Block $9^f$ is free to move between end $9^d$ of the offset part $9^c$ of feed-plunger handle $9^b$ and the end of said handle $9^b$. When said block is caused to move beyond these limits said plunger is carried with it. In case the rearward movement of plunger 9 meets an opposing force of predetermined amount, spring $8^n$ is compressed and dog $8^i$ is disengaged from block $9^f$ and slide $8^h$ completes its rearward movement without taking said plunger farther. On returning said dog again engages with said block and said skewer is withdrawn within plunger 9 and both are returned to their starting point. The skewer is thus enabled to impale the new piece of fish in front of the plunger and retain the same in regular order until it is nested in the slice cut before it. On the rearward end of shaft $2^g$ is a bevel gear $2^j$ which engages with bevel gear $3^c$ on the lower end of vertical counter shaft $3^a$. Said vertical shaft is mounted for rotation in bearings on table top 2 and on frame 3. Near its upper end is mounted gear $3^d$ which engages forward with gear $3^g$ mounted near the upper end of a parallel, vertical shaft $3^f$ which is mounted for rotation in bearings on frame 3 and table top 2. Near the lower end of shaft $3^f$ and above table top 2 is rigidly mounted the double-crank disk $3^i$ having wrist pin $6^t$. The slotted end of connecting rod $6^o$ is engaged with pin $6^t$. The other end of said connecting rod is pivotally engaged with crank $6^i$ of fork arm $6^h$. Said fork arm is pivotally mounted for horizontal oscillation on drive arm 6 on a stud screw through its hub $6^j$. The end of fork arm $6^h$ is bifurcated and has vertically-registering, slotted holes in which is engaged the fork head $6^e$, Figs. 2 and 11. The lower of said bifurcations is extended and constitutes an eye which is pivotally engaged to connecting rod $6^k$. The other end of said connecting rod is pivotally engaged with a lug $6^n$ on a slide plate $6^u$, Figs. 2, 5, 11 and 13. Fork head $6^e$ has a handle $6^f$. Between said handle and an ear $6^p$ on fork arm $6^h$ is connected a coil spring $6^q$. To fork head $6^e$ are attached two horizontal tines $6^d$, $6^d$, Figs. 1, 2, 5, and 11. Said tines are reciprocally engaged in parallel holes in vertical cylinder $6^c$. Said cylinder $6^c$ is mounted for partial revolution in a vertical hole in the flange of drive arm 6. The reciprocation of feed fork $6^d$ in the cylinder $6^c$ causes said fork to enter transversely into and be withdrawn from tube $2^c$. At the shorter end of fork arm $6^h$ is another crank $6^r$ having a vertical stud $6^s$. Said stud engages for sliding in a slideway $7^c$ in the form of a figure with four arc-like sides, Figs. 1 and 8. Said slideway is formed in a horizontal plate $7^a$ fastened to a lug 7 on table top 2. Plate $7^a$ has a central part fastened in place by bridge pieces $7^b$. Pivotally attached to plate $7^a$ are two dogs $7^d$ and $7^e$. Said bridge piece $7^b$ also serves as a stop for the bit ends of said dogs. The tail ends of dogs $7^d$ and $7^e$ have sockets in which is mounted a coil spring $7^f$. Slide plate $6^u$ is mounted for sliding in a diagonal slideway on the bottom side of table top 2. When in place the bottom of said slide plate is flush with the bottom of said table top. A diagonal slot $6^v$ in the table top provides room for the normal movements of lug $6^n$ rigidly attached to said slide. Said slideway passes under tube $2^c$ so that slide plate $6^u$ may close a hole 12, Fig. 2, in the bottom of said tube. In Figs. 1 and 2 the drive arm 6 and fork arm $6^h$, carried thereon, are shown in full lines. In this position: said drive arm 6 is in its farthest left position, slide plate $6^u$ completely closes hole 12, feed fork $6^d$ is fully extended across tube $2^c$ and in its farthest-left position, and wrist pin $6^t$ in crank disks $3^i$, $3^i$ is in its farthest-left position. This location of parts will be hereinafter referred to as the first quadrant position. This position of the fork $6^d$ and controlling mechanism are also shown in the diagram in Fig. 20. The farthest-right position of drive arm 6 is shown in dotted outline at $6'$ in Figs. 1, 18 and 19. And three operative positions of fork arm $6^h$ are shown in dotted outlines at $6^{h\prime}$, $6^{h\prime\prime}$ and $6^{h\prime\prime\prime}$ in Figs. 1, 17, 18 and 19. Also the three positions of connecting rod $6^o$, which cause the said three operative positions of fork arm $6^h$ referred to, are shown in dotted lines at $6^{o\prime}$, $6^{o\prime\prime}$ and $6^{o\prime\prime\prime}$ in Figs. 1, 17, 18 and 19. On vertical shaft $3^f$, between gear $3^g$ and crank disks $3^i$, is rigidly mounted cam $3^h$. A vertical slide bar $3^v$ is mounted for sliding in upper slideway $3^m$ and lower slideway $3^u$, both of which are rigidly attached to frame 3. On a boss $3^y$, rigidly attached to the left side, Fig. 10, of slide bar $3^v$ is mounted the roller $3^x$. Said roller bears on cam $3^h$. On the right side, Fig. 10, of slide bar $3^v$ is rigidly attached horizontal arm $3^w$ which terminates in yoke $3^s$. Said yoke is mounted on a neck $3^l$, Fig.

12, of cylindrical-knife plunger $3^k$ in a manner to permit said plunger to revolve in said yoke. Plunger $3^k$ has a hollow stem $3^t$ rigidly attached centrally. Said stem terminates above in a hollow threaded body or screw $3^r$. Screw $3^r$ is mounted in threaded bearing 14. Plunger $3^k$ is mounted for reciprocation and revolution in vertical cylinder $3^j$ which is concentric with threaded bearing 14 and is rigidly attached to table top 2. To the lower end of plunger $3^k$ is fastened hollow-cylindrical charge cutter or knife $3^n$ of the same external diameter as said plunger. Said plunger and cutter reciprocate and revolve in cylinder $3^j$. A charge piston $3^o$ having a stem $3^p$ is mounted within knife $3^n$ with said stem in a central hole in plunger $3^k$, stem $3^t$ and screw $3^r$. The upper end of stem $3^p$ extends beyond screw $3^r$ is threaded and has a nut thereon. A coil spring $3^z$ is mounted on stem $3^p$ between piston $3^o$ and plunger $3^k$. Stops $3^q$ in the lower end of cylinder $3^k$ prevent the nearer approach of said piston to said plunger than is shown in Fig. 13. The revolution of cam $3^h$ causes plunger $3^k$ and annular knife $3^n$ to reciprocate in cylinder $3^j$ while the screw $3^r$ operating in threaded bearing 14 causes said cylinder and knife to revolve as they reciprocate. The rear end of tube $2^c$ is widened and its sides are cylindrical segments. Central with said segments is vertical stud $4^h$ rigidly attached to the bottom of tube $2^c$. Mounted on said stud and in said segments is a two-part, charge mold 4, 4 having handles $4^a$, $4^a$. Vertically pivoted at the ends of said handles are the knobs $4^f$, $4^f$. Each of said knobs has a horizontal hole in which is mounted for reciprocation the spring rod $4^g$. Each end of said rod is threaded and has a nut, and between one of said nuts and one of said knobs and on said rod is the coil spring $4^i$. The jaws of mold 4, 4 are shaped to form segments of a cylinder concentric with and of the same size as the hole 12 in the bottom of tube $2^c$ when the handles of said clamp are opened as shown in full lines in Fig. 2. On one of arms $4^a$, $4^a$ is the roller $4^b$ mounted on a vertical stud for revolution. Roller $4^b$ bears on the quadrant cam $4^d$. On the other of said arms $4^a$, $4^a$ is the roller $4^c$ similarly mounted and bearing on the quadrant cam $4^e$. Cams $4^d$ and $4^e$ are rigidly mounted on vertical shaft $3^b$. Shaft $3^b$ is mounted for revolution in bearings on table top 2 and frame 3, and has the gear wheel $3^e$ rigidly mounted thereon. Said gear $3^e$ engages with gear $3^d$ and is driven thereby. A tube $2^d$ of rectangular cross section parallel with and below tube $2^c$ extends the full length of the machine. The disks $5^d$, $5^e$ of a Geneva movement are rigidly mounted on vertical shaft $3^f$ near its lower end. Disk $5^d$ has the vertical stud $5^f$, Fig. 3. Spider $5^b$ is rigidly mounted on vertical shaft 5, which is mounted for revolution in bearings on bar $2^b$ and tube $2^d$, Fig. 10. Said spider $5^b$ has four segmental notches $5^m$ and four radial arms in the end of each of which is a slot $5^h$, Fig. 3. Disk $5^e$ has a segmental quadrant notch $5^n$. Disks $5^d$, $5^e$ and spider $5^b$ are so related that the revolution of shaft $3^f$ causes stud $5^f$ to engage with one of slots $5^h$ and revolve disk $5^b$, the quadrant section $5^n$ affording room for one of the arms of said spider to pass over disk $5^d$. When stud $5^f$ passes out of said arm slot disk $5^e$ has sufficiently entered a segmental notch $5^m$ in spider $5^b$ to prevent further movement of said spider until stud $5^f$ has completed a revolution and engaged with a slot $5^h$ in another of said spider arms. Shaft 5 has gear $5^j$ rigidly attached thereto. Gear $5^j$ meshes with gear $5^k$ on vertical shaft $5^a$ which is mounted for revolution in bearings on bar $2^b$ and tube $2^d$. On the upper end of shaft 5 and in an opening in one side of tube $2^d$ is rigidly mounted one of a pair of can-feed spiders $5^b$. On shaft $5^a$ in an opening in the other side of tube $2^d$ is rigidly mounted the other one of said pair of can-feed spiders $5^c$. On the middle of the bottom of tube $2^c$ and in front of mold 4 is longitudinal guide knife 10 to aid in keeping the slices of fish in order, and on the middle of said bottom on the front edge of hole 12 is segmental shear plate 11 registering with said hole. Beneath table top 2 in bearings on bars $2^e$ transverse shaft $2^m$ is mounted for revolution. Said shaft bears pulley $2^n$. On pulley $2^n$ is conveyer belt $2^o$ which is driven by a distant pulley not shown. Conveyer belt $2^o$ passes toward the rear end of the machine over the bottom of tube $2^d$, and carries empty cans from a distant machine, not shown, to can-feed spiders $5^b$, $5^c$. Arrows indicate the direction of movement of several parts of the machine which move in one direction only. The gear connections between the several shafts all have the ratio of one. Therefore, one revolution of pulley $2^h$ causes one revolution of cam $2^k$, knife $2^v$, cam $3^h$, one quarter revolution of can-feed spiders $5^b$, $5^c$, and one complete vibration of drive arm 6. In this description one of said revolutions will be segregated into quadrants and the illustrated full-line position of the several movable parts will be called the first-quadrant position, and the time between the first and second quadrant positions will be called the first quadrant of operation, and so on.

My machine operates as follows: Assume the drive pulley $2^h$ and conveyer $2^o$ to be in continuous operation. Also assume that the machine has been in normal operation and that slices of fish A, A, etc., shown in dotted lines in Figs. 1 and 2 occupy the tube $2^c$ between hopper $2^w$ and charge mold 4, also said charge mold 4 is closed and the opening 4ˡ between its jaws filled with fish, and an empty can is retained between can-feed spiders 5ᵇ and 5ᶜ. Butchered fish are placed one at a time by hand in hopper 2ʷ with their backs toward the rear of the machine and their flanks spread out on each side of embossment 2ˣ. Slicing knife 2ᵛ occupies the position shown in full lines and is rotating with its sharp convex edge forward. The fish in hopper 2ʷ has dropped downward and is resting on the bottom of tube 2ᶜ.

During the first-quadrant of operation: Slicing knife 2ᵛ moves to dotted position 2ᵛ′ and completely severs a slice A from said fish. In cam 2ᵏ roller 8ᶜ occupies a position in said cam shown in dotted lines at 8ᶜ′ in Fig. 9 and therefore lever 8 has not been moved. Pin 6ᵗ on crank disks 3ˡ has moved to dotted position at 6ᵗᵃ and has only reached the inner end of the slot in connecting rod 6ᵒ and therefore has not reciprocated said rod. Quadrant cams 4ᵈ and 4ᵉ have moved through a quadrant and, while still retaining mold 4 in the full-line position shown, their further rotation will permit said jaws to be opened by the pressure of spring 4ˡ. Cam 3ʰ has caused roller 3ˣ to occupy the position shown in dotted lines at 3ˣ′ which has caused annular knife 3ᵃ to descend to a point just below the top of segmental shear plate 11 and above slide plate 6ᵘ and cut the charge of fish which is between the jaws of mold 4 loose from the fish in tube 2ᶜ, and charge plunger 3ᵒ rests on top of the charge of fish in mold 4. Stud 5ᶠ on disk 5ᵈ has moved to dotted position 5ᶠ′, and disk 5ᵉ has held can-feed spiders 5ᵇ and 5ᶜ stationary. Fig. 17 shows by diagram the position of fork 6ᵈ and connected mechanism when crank pin 6ᵗ has moved to 6ᵗ′, or about 15° beyond its position at the end of the first quadrant.

Figure 18:
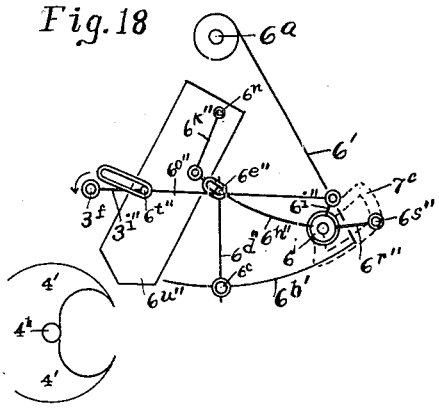
Figure 19:
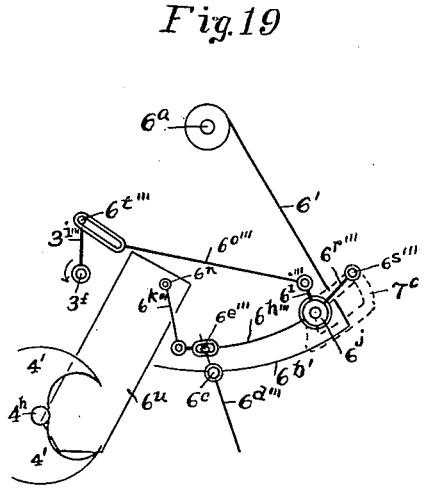
Figure 20:
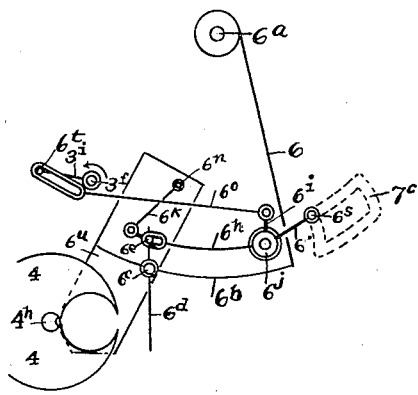

During the second-quadrant of operation: Slicing knife 2ᵛ moves to dotted position 2ᵛ″. Cam 2ᵏ causes roller 8ᶜ to occupy dotted position 8ᶜ″ in Figs. 5 and 9, causing lever 8 to move to dotted position 8′ which has operated to cause the sharpened end of skewer needle 9ᵉ first to move out of feed plunger 9 and pierce the slices of fish in front of the same and then move with said plunger to their dotted positions at 9ᵉ′ and 9′ respectively, Fig. 5, pushing the slices of fish in tube 2ᶜ in front of said feed plunger while said slices are skewered on said needle's end. Cams 4ᵈ, 4ᵉ move to permit rollers 4ᵇ, 4ᶜ to bear on their surfaces of least radius, which under the pressure of spring 4ˡ causes charging mold 4 to occupy its open or dotted position shown in Fig 2. Wrist pin 6ᵗ between crank disks 3ˡ moves from dotted position 6ᵗᵃ to a position within 15° of 6ᵗ″ which is shown in dotted lines in Fig. 1 and also shown in diagram Fig. 18. The first movement of said pin 6ᵗ, from 6ᵗᵃ to 6ᵗ′, in its second quadrant, reciprocated connecting rod 6ᵒ toward the right. Drive arm 6 could not move because stud 6ˢ on crank 6ˡ was against the dog 7ᵉ. Hence the longitudinal pressure of pin 6ᵗ on rod 6ᵒ caused fork arm 6ʰ to turn about pivot 6ʲ until stud 6ˢ reached the dotted position 6ˢ′, Figs. 1 and 17. This movement of said fork arm occurs during the first fifteen degrees of movement of pin 6ᵗ in the said second quadrant of movement. When stud 6ˢ is in dotted position 6ˢ′ fork arm 6ʰ is in dotted position 6ʰ′, Figs. 1 and 17, and fork 6ᵈ has been entirely withdrawn from tube 2ᶜ until the ends of its sharpened tines lie in cylinder 6ᶜ. Also slide plate 6ᵘ has been withdrawn from hole 12 and occupies its dotted position at 6ᵈ′, Fig. 2. When stud 6ˢ reaches position 6ˢ′ in slideway 7ᶜ it is free to move toward the right in said slideway, and the continued movement of pin 6ᵗ in its second quadrant forces rod 6ᵒ farther toward the right. Hence, when said pin 6ᵗ has completed its second quadrant of movement, stud 6ˢ has passed dog 7ᵈ and reached its dotted position at 6ˢ″, drive arm 6 is in its dotted position at 6′ and fork arm 6ʰ is in its dotted position at 6ʰ″. In cam 3ʰ roller 3ˣ occupies dotted position 3ˣ″, see Fig. 6. Hence the movement of cam 3ʰ through its second quadrant causes no change in the position of plunger 3ᵏ. And stud 5ᶠ, Fig. 3, has moved to its dotted position at 5ᶠ″ which has caused no movement in can-feed spiders 5ᵇ, 5ᶜ. Fig. 18 shows by diagram the position of fork 6ᵈ and connected mechanism when crank pin 6ᵗ has moved to position 6ᵗ″, or about 15° beyond its position at the end of the second quadrant.

During the third quadrant of movement: Slicing knife 2ᵛ moves to its dotted position at 2ᵛ‴ which takes it entirely from under the hopper opening. Cam 2ᵏ causes roller 8ᶜ to occupy its dotted position at 8ᶜ‴, Fig. 9, which causes lever 8 to return to its full-line position, Fig. 5. This movement of lever 8 first operates to draw skewer 9ᵉ entirely within plunger 9 and then returns said skewer and plunger to their full-line positions shown in Fig. 5, which withdraws plunger 9 entirely from under the opening in hopper 2ʷ and permits the fish in said hopper to pass downward to the floor of tube 2ᶜ. Crank disks 3ˡ carry pin 6ᵗ to within 15° of its dotted position at 6ᵗ‴. During this quadrant of movement said pin moves only the length of the slot in rod 6ᵒ and therefore neither drive arm 6 nor its attached mechanism is moved. But after disk 3ˡ has revolved to bring pin 6ᵗ fifteen degrees beyond the end of the third quadrant or to position 6ᵗ⁗, Figs. 1 and 19, the fork mechanism is in the position shown in diagram in Fig. 19. Cams 4ᵈ and 4ᵉ are in a part of their revolution during the third quadrant of movement where rollers $4^b$ and $4^c$ are bearing on cam surfaces of least radius and hence mold 4 remains open. Cam $3^h$, during the first one third of the said third quadrant of movement, forces roller $3^x$ to occupy the position shown in dotted lines at $3^{xa}$ Figs. 6 and 10. This is the lowest limit of movement of said roller. Hence, during said first one-third quadrant of movement, cylindrical knife $3^n$ is moved down to the bottom of can B', which is then retained in can-feed spiders $5^b$ and $5^c$, and piston $3^o$ follows, carrying the charge of fish C' down to fill said can B', see Fig. 13. During the remaining two thirds of the said third quadrant of movement roller $3^x$ is carried to its dotted position at $3^{x'''}$, Fig. 6. Hence, during said two-thirds of this period, knife $3^n$ and piston $3^o$ are carried to their highest position shown in full lines in Fig. 5. And during said third quadrant of movement stud $5^f$, Fig 3, moves to its dotted position at $5^{f'''}$ and can-feed spiders $5^b$ and $5^c$ are not moved.

During the fourth quadrant of movement: Slicing knife $2^v$ moves from its dotted position at $2^{v'''}$ to its full line position, Fig. 1. Roller $8^c$ is moved from its dotted position at $8^{c'''}$ to its full line position Fig. 9, and does not cause lever 8 to move. Crank disks $3^i$ carry pin $6^t$ from a position $15^b$ ahead of that shown at $6^{t'''}$, Figs. 1 and 19, to its full line position at $6^t$ in Fig. 1. During this entire quadrant of movement connecting rod $6^o$ is reciprocated toward the left. This movement exerts a leftward pull on stud $6^s$. But since at the beginning it is in its dotted position at $6^{s''}$, dog $7^d$ prevents it from moving leftward and it therefore first moves upward in slideway $7^c$ under bridge piece $7^b$ to its dotted position at $6^{s'''}$. This upward movement of stud $6^s$ does not move drive arm 6 but causes fork arm $6^h$ to turn downward from its dotted position at $6^{h''}$ to its dotted position at $6^{h'''}$, Figs. 1 and 19, which moves fork $6^d$ endwise across tube $2^c$ into fish A to its dotted position at $6^{d'''}$, and also causes slide plate $6^u$ to move from its dotted position where it again completely closes hole 12. The remainder of the fourth quadrant of movement of pin $6^t$ causes stud $6^s$ to move from position $6^{s'''}$ past dog $7^e$ to its full line position at $6^s$ and drive arm 6 moves with its attached mechanism to their full line positions shown in Figs. 1 and 2. Said movement carries fork $6^d$ along tube $2^c$ from its dotted position at $6^{d'''}$ toward the rear to its full line position at $6^d$ and forces fish into the open mold 4. Cam $3^h$ causes no change in position of roller $3^x$ during said fourth quadrant of movement. Cams $4^d$, $4^e$ cause rollers $4^b$ and $4^c$ to bear against the larger circumference of said cams during the very last part of said fourth quadrant of movement and returns said rollers to their full line positions shown in Fig. 2. Hence the jaws of mold 4 are brought to their full line positions and closed on fish A at the end of said fourth quadrant of movement. And stud $5^f$, Fig. 3, moves from its dotted position at $5^{f'''}$ into engagement with a slot $5^h$ in one of the arms of spider $5^g$ at the beginning of the fourth quadrant of movement and revolves said spider through a quarter of a revolution during said fourth quadrant of movement. Hence can-feed spiders $5^b$ and $5^c$ are revolved through a quarter of a revolution during said fourth quadrant of movement which causes the can B', which has been filled with fish as described, to be carried rearward to its dotted position at C, and brings an empty can into the central opening between said spiders. Meanwhile the conveyer belt $2^o$ has been bringing empty cans to said can-feed spiders as rapidly as they have been feeding them rearward through tube $2^d$. Thus one revolution is completed and subsequent revolutions cause a similar sequence of movements of the parts of the machine. The skewer $9^e$ and guide knife 10 in the bottom of tube $2^c$ aid in keeping the slices A, A etc. in regular order in said tube. The slip-hold engagement of dog $8^i$ with block $9^f$ prevents undue pressure from being exerted on said slices A by plunger 9. The amplitude of the feeding movements of fork $6^d$, as described, can be made of any desired amount by choosing the proper radius for wrist pin $6^t$. Hence the pieces A can be placed in mold 4 by said fork without undue pressure or mutilation and for the most part with skin outward. The automatic release of feed plunger 9 afforded by dog $8^i$ operating under the pressure of spring $8^n$ is of the greatest importance in an entirely automatic machine such as this. For, because of the varying size of different fish as well as the varying size of different slices of the same fish, regularity of action of slicing and molding means must be accompanied by automatic irregularity of feeding means. The irregularity of the feeding means described is controlled by the capacity of the molding means.

Having thus fully described my can filler, what I claim as new and desire to secure by Letters Patent is,

1. In combination, in a machine of the character described, a fish slicer, a fish-slice plunger, a charge mold, and automatic means to control the operation of said fish plunger dependent on the operative capacity of said charge mold.

2. In a machine of the character described, in combination, a fish slicer, a fish-slice plunger, a charge mold, a can filler, means to operate said slicer, mold and filler in timed relation, and automatic means to operate said fish plunger dependent on the operative capacity of said charge mold.

3. In a machine of the character described, in combination, a fish slicer, a fish-slice plunger, a feed fork, a charge mold, a can filler, means to operate said slicer, fork, mold and filler in timed relation, and automatic means to operate said plunger dependent on the operative capacity of said charge mold.

4. In a machine of the character described, in combination, a fish slicer, a fish-slice plunger, a feed fork, a charge mold, a charge cutter, a can feed, means to cause said slicer, fork, mold, cutter and can feed to operate in timed relation, and automatic means to operate said fish-slice plunger dependent on the operative capacity of said charge mold.

5. In a machine of the character described, in combination, a U-form fish hopper, a horizontal, spiral fish slicer operable across the bottom of said hopper, a horizontal slice tube beneath and connected with said hopper, a fish-slice plunger operable in said slice tube beneath said hopper, a spring-held feed fork operable in said slice tube in front of said plunger, a charge mold operable in said slice tube in front of said fork, a can tube beneath said slice tube, a can-feed movement in said can tube beneath said charge mold, an empty can in said can feed registering with the said charge mold, a hollow, cylindrical charge cutter registering with said can and mold and mounted for reciprocal movement through said mold and in and out of said can, a charge plunger within said charge cutter, a withdrawable slide between said charge mold and said empty can, means to cause said fish slicer, feed fork, mold, can feed, slide, charge cutter, and charge plunger to operate in timed relation, and automatic means to operate said fish-slice plunger dependent on the operative capacity of said charge mold.

6. In a machine of the character described, in combination, a fish slicer, a fish-slice plunger, a closable charge mold, an annular knife reciprocable concentric with said charge mold when the same is closed, and means to cause said annular knife to pass through said charge mold when the same is closed.

7. In a machine of the character described, in combination, a fish slicer, a fish-slice plunger, a closable charge mold, an annular knife reciprocable concentric with said charge mold when the same is closed, a discharge plunger reciprocable within said annular knife, means to cause said annular knife to pass through said charge mold when the same is closed, and means to cause said charge plunger to reciprocate within said annular knife.

8. In a machine of the character described, in combination, a fish slicer, a fish-slice plunger, a closable charge mold, an annular knife reciprocable concentric with said charge mold when the same is closed, a discharge plunger reciprocable within said annular knife, a can feeding mechanism beneath said charge mold, a slide between said charge mold and said can feed, an empty can in said can feed concentric with said annular knife, means to withdraw said slide from between said charge mold and said empty can, means to cause said annular knife to pass through said charge mold when the same is closed and enter and leave said can, means to cause said discharge plunger to reciprocate within said annular knife and enter and leave said can, and means to cause said fish slicer, charge mold, annular knife, discharge plunger, can-feeding mechanism and slide, to operate in timed relation.

Signed at Bellingham in the county of Whatcom and State of Washington this 28th day of June A. D. 1916.

ROYAL KNIGHT.

Witnesses:
C. A. TOLER,
R. S. SIMPSON.